United States Patent [19]

Merchant

[11] Patent Number: 4,782,333

[45] Date of Patent: Nov. 1, 1988

[54] WATER-FLOW DETECTOR WITH RAPID SWITCHING

[75] Inventor: David E. Merchant, Lincoln, Nebr.

[73] Assignee: Pittway Corporation, Northbrook, Ill.

[21] Appl. No.: 28,774

[22] Filed: Mar. 23, 1987

[51] Int. Cl.$^4$ ............................................. G08B 21/00
[52] U.S. Cl. .................................. 340/610; 137/554;
200/81.9 R; 73/861.75; 116/274
[58] Field of Search ............... 340/610, 606, 529, 611;
200/81.9 R, 81.9 HG, 81.9 M; 307/118;
137/552.7, 554, 557; 73/861.74, 861.75, 861.76;
169/23, 60; 116/273, 274, 275

[56] References Cited

U.S. PATENT DOCUMENTS 3,091,758 5/1963 Lewis .................................. 340/610

*Primary Examiner*—Joseph A. Orsino
*Assistant Examiner*—Jill D. Jackson
*Attorney, Agent, or Firm*—Dressler, Goldsmith, Shore, Sutker & Milnamow, Ltd.

[57] ABSTRACT

A cylindrical shuttle having a cone-shaped cam surface on one end which slides freely on a timer shaft between a first stop and a second stop which are attached to the shaft. A vane arm driven by a water vane engages the side of the first stop opposite the shuttle. In the normal (no-flow) condition, the vane return spring presses the vane arm against the first stop, which in turn forces the shuttle cam surface against the plungers of two microswitches on either side of the timer shaft, causing the plungers to ride up the cam surface to rest on the shuttle. When water flows, the vane arm releases the first stop and the timer shaft begins to move. After the shaft moves the free distance between the second stop and the shuttle, the second stop engages the shuttle and forces it out from under the plungers. When the plungers reach the cam surface, the shuttle cams out from under the plungers allowing them to release freely and rapidly.

14 Claims, 3 Drawing Sheets

1

WATER-FLOW DETECTOR WITH RAPID SWITCHING

Field of the Invention.

The invention in general relates to the field of water-flow indicators that are designed to be mounted on a water-pipe of sprinkler-type fire suppressant systems to activate an alarm when water flows in the pipe. In particular, it relates to such water-flow indicators having a time delay function.

Description of the Prior Art

Water-flow detectors, sometimes referred to as water-flow indicators, which are mounted on the pipes of sprinkler-type fire suppressant systems are well-known. These systems generally include a paddle or vane which is placed within the pipe or other conduit carrying the water. The vane is connected to a pivot arm which connects to an alarm actuator. A problem with such water-flow detectors is that transient flows can occur in the sprinkler system pipes; for example, when a pump that maintains pressure in the system turns on, air trapped in the system will be compressed, which may cause water to temporarily surge past the flow detector location. Such temporary surges can trigger false alarms which are a nuisance. The common way to avoid such nuisance alarms is to provide a time delay between the beginning of the flow and signaling an alarm. Typically, an adjustable pneumatic dashpot (similar to that of a screen door closer) retard mechanism is used to provide the delay.

The prior art delay mechanisms generally are adjustable from zero delay to delays of several minutes. At the longer delay settings, the timing mechanism which controls the switching of the alarm moves slowly activating the switches slowly. This has resulted in arcing in the switches and/or the need for relatively expensive switches.

SUMMARY OF THE INVENTION

It is an object of the invention to provide a water-flow detector having a time delay function in which the switch controlled by the time delay switches rapidly.

It is a further object of the invention to provide a water flowdetector providing the above object reliably and inexpensively.

It is another object of the invention to provide a water-flow detector providing one or more of the above objects while employing a conventional delay timer.

The invention provides a water-flow detector comprising a water vane; a switch including a switch actuator member and a means for applying a bias force to the actuator member; a delay timer responsive to the movement of the vane and including a movable timer member and a means for moving the timer member over a predetermined distance corresponding to a predetermined time; a cam means engageable with the switch actuator member for forcing the actuator member in a direction opposed to the bias force and for permitting the actuator member to release in the direction of the bias force; and means for causing the movement of the cam means to be controlled by the delay timer while permitting the cam means to move substantially free of the timing member during the release of the actuator member. Preferably the means for causing and permitting comprises a first stop means for engaging the cam means and urging it in a direction in which it tends to force the actuator member in a direction opposed to the bias force and a second stop means for engaging the cam means and urging it in a direction in which it tends to release the actuating member, the first and second stop means being attached to the timing member and spaced by a distance equal to the distance between the points on the cam means at which the stop means engage the cam means. Preferably the cam means comprises a caming shuttle movable along said timer member between said stops. Preferably the flow detector further includes a means for adjusting the distance between the stops. Preferably there is also a means for adjusting said predetermined time.

The invention provides a significantly more reliable switching mechanism at a lower cost than the cost of prior art flow detectors. Numerous other features, objects and advantages of the invention will now become apparent from the following detailed description when read in conjunction with the accompanying drawings.

DESCRIPTION OF THE PREFERRED EMBODIMENT

Figure 1:
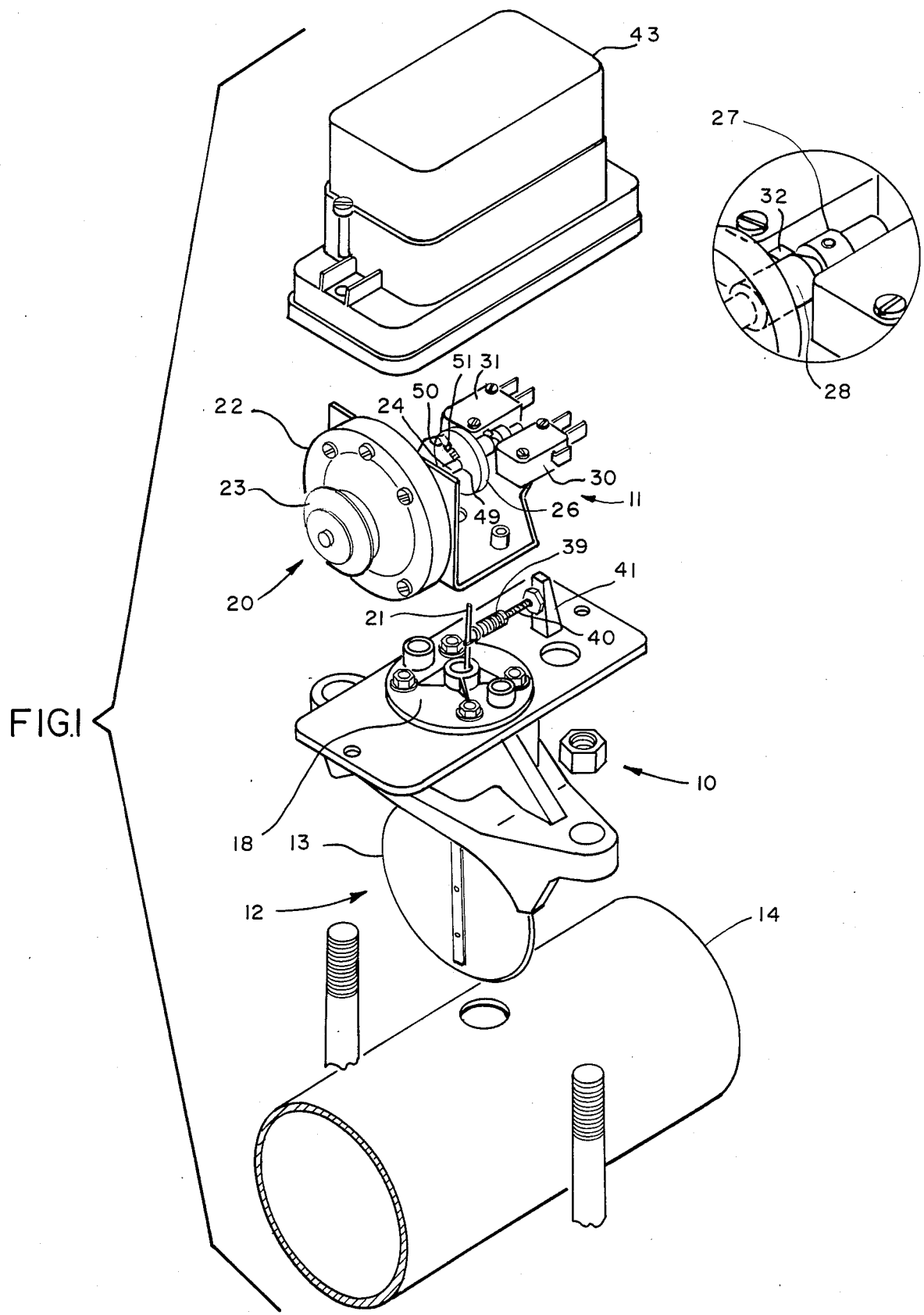
FIG. 1 is an exploded view of a water-flow detector according to the invention with an inset showing a magnified view of the caming shuttle and associated stops.
Figure 2:
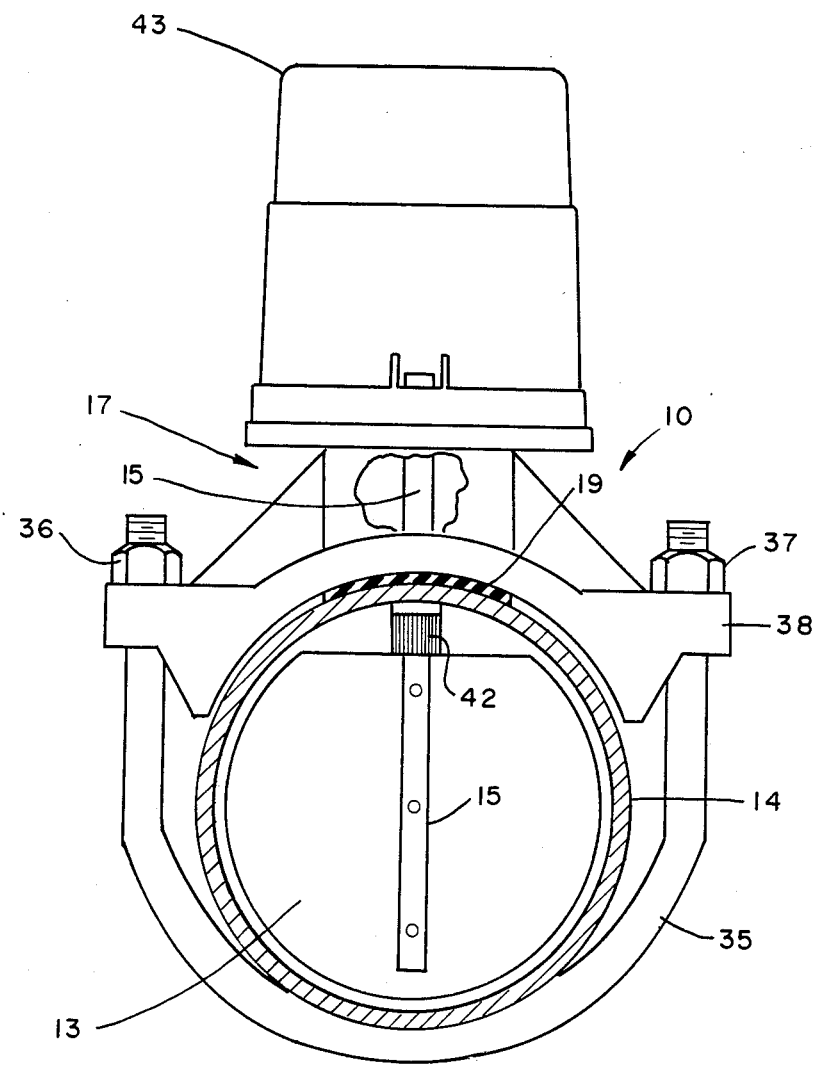
FIG. 2 is an end view of the detector of FIG. 1 installed in a water pipe.

Directing attention to FIG. 1, an exploded view of the preferred embodiment of the water-flow detector according to the invention is shown. While the invention will be described in connection with a preferred embodiment, it will be understood that it is not intended to limit the invention to that embodiment. The embodiment includes a water-vane assembly 10 and a timer and switch assembly 11. The water vane assembly 10 includes a vane 12 having a paddle 13 designed for insertion within a pipe 14 of a sprinkler-type fire suppressant system, and an arm 15 which passes through a water seal 17 (FIG. 2) and which is mounted on a pivot (not shown) just below plate 18 in the vane assembly. The timer and switch assembly 11 includes a delay timer 20 having a moveable timer shaft member 24 and switches 30 and 31 having switch actuator members 32 and 33 and internal springs 57 (FIG. 5) which bias the members 32 and 33 toward shaft 24. A cam means 28 slides on the shaft member 24. Means 25 for causing the movement of the cam means 28 to be controlled by the timer 20 comprises a first stop means 26 attached to the shaft 24 for engaging the cam means 28 and urging it in a direction in which it tends to force the actuator member 32 and 33 in a direction opposed to the bias force and a second stop means 27 attached to the shaft 24 for engaging the cam means 28 and urging it in a direction in which it tends to release the actuating members 32 and 33. The timer and switch assembly 11 is mounted on the vane assembly 10 so that a vane arm member 21 opposite paddle 13 acts upon stop 26 to operate the time delay and switches in response to water flow in pipe 14. Normally the arm member 21 presses against stop 26 to keep the time delay mechanism and switches cocked in the ready position. Water flow in pipe 14 in the direction indicated by the arrow associated with vane 12 in FIG. 1 causes arm 15 to pivot and member 21 to move away from stop 26, which activates the time delay mechanism, which pulls removable timer shaft 24 to the right in FIGS. 3 through 5 a predetermined distance corresponding to a predetermined time, which causes caming means 28 to move to the right (in FIG. 3); when caming means 28 has moved the set (predetermined) distance which marks the expiration of the time delay period it releases switch actuator members 32 and 33 to activate switches 30 and 31. Switches 30 and 31 would generally be connected into a fire alarm control panel (FACP) (not shown) so that their activation sounds an alarm, flashes annunciator lights showing where the fire is occurring, and/or sends a signal to a central station where fire fighters are alerted.

Turning now to a more detailed description of the preferred embodiment (and referring to FIGS. 1 and 2), the water vane assembly 10 includes u-bolt 35, nuts 36 and 37, pipe saddle 38, gasket 19, paddle 13, arm 15, plate 18, arm member 21, spring 39, screws 40 and support 41. Spring 42 allows the paddle 13 to be pressed up into the pipe by the water flow so as not to obstruct the flow once it begins. A cover 43 encloses the top portion of the timer and switch assembly 11 and water vane assembly 10. The water vane assembly 10 is conventional and thus will not be discussed in further detail. For example, such assemblies are incorporated in the Series WFD and WFD-10 Vane-Type Water Flow Indicators available from Notifier Company, 3700 North 56th Street, Lincoln, Neb. 68504.

Figure 3:
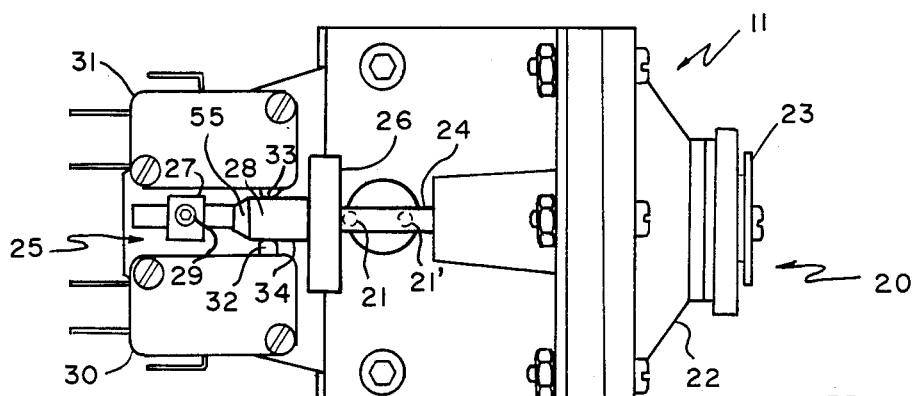
FIG. 3 is a plane view of the time delay and switch mechanism showing the normal position and the position immediately after water flow has begun.
Figure 6:
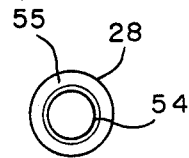
FIG. 6 is an end view of the caming shuttle according to the invention.
Figure 4:
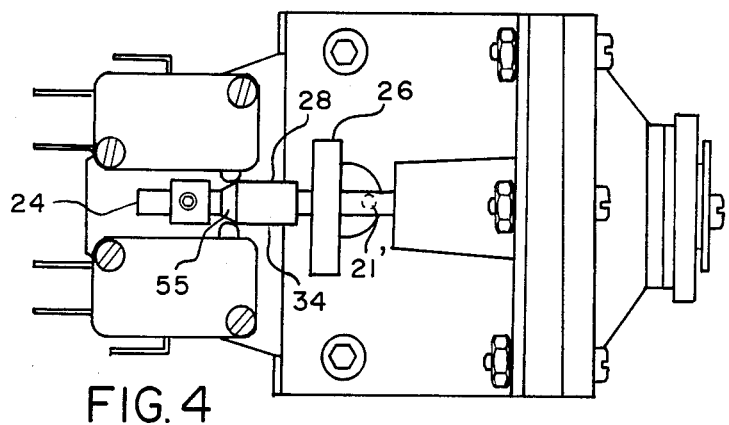
FIG. 4 is the same view as in FIG. 3 immediately before the time delay has expired.
Figure 5:
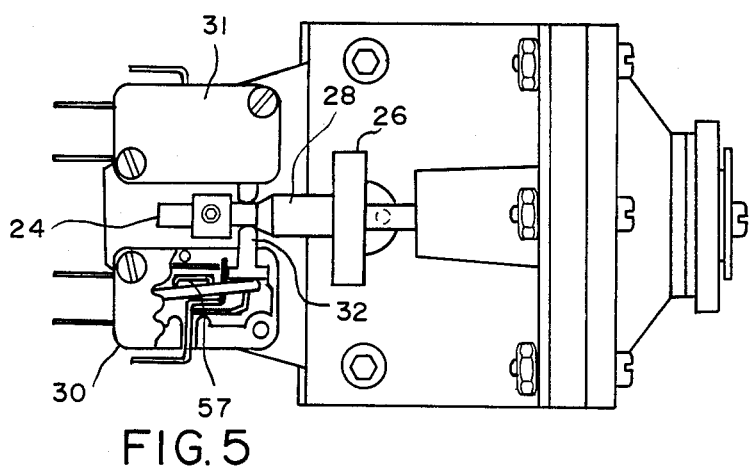
FIG. 5 is the same view as the above two figures after the time delay has expired.

Turning to FIGS. 3 through 5, the timer and switch assembly 11 includes a diaphragm type air chamber 22 with variable bleed off mechanism 23. These portions of the timer will not be discussed further as they are conventional in the Series WFD and WFD-10 Vane-Type Water Flow Indicators discussed above. The parts of particular interest in the present invention are the movable timer member 24, stop 26, stop 27, cam means 28, and switches 30 and 31 which each include a switch actuator member 32 and 33 respectively. In the preferred embodiment, timer member 24 is a cylindrical shaft of about 0.156 inches in diameter; stop 26 is a disc about three-eights-inch thick and seven-eights inch in outside diameter, having an axial bore 49 of about 0.156 inches in diameter, and having a threaded bore 50 in which a set screw 51 is screwed to hold the stop to shaft 24. Stop 27 is preferably a hollow cylinder of about one-quarter inch in length and outside diameter and about 0.157 inch inside diameter. It also has a threaded bore in which a set screw 29 is screwed to fasten it to shaft 24. Caming means 28 is preferably a hollow three-quarter- inch long cylinder of about one-quarter inch outside diameter and having an inside diameter 54 of about 0.170 inches which cylinder is turned on one end to form a sloping cam surface 55 in the form of a frustum of a cone. (See FIGS. 3 through 6). The sloping portion 55 is preferably about one quarter-inch in length. Cam means 28 may be referred to as a caming shuttle in the preferred embodiment since it shuttles back and forth on shaft 25. Switches 30 and 31 are preferably identical single pole, double throw switches having plunger type actuator members 32 and 33 which are biased in the outward direction (toward shaft 24) by a means 57 for applying a bias force, which is preferably a conventional leaf type spring within the switches (see FIG. 5).

In the preferred embodiment the timer shaft 24 is made of stainless steel, the stop 26 is made of polycarbonate, shuttle 28 is made of ultra high molecular weight polyethylene and stop 27 is made of aluminum, although any other suitable non-corroding metals or materials may be used. Switches 30 and 31 are preferably 10 amp, 250 volt snap action micro type switches such as an OMRON TM Model V.

Referring to FIGS. 3 through 5, the water flow detector operates as follows: When water flows in the direction of the arrow associated with vane 12 in FIG. 1, the vane arm member 21 moves out from forward stop 26 from the position shown at 21 in FIG. 3 to the position shown at 21'. This allows the stop 26 and timer shaft 24 to begin to move to the right in FIGS. 3 through 5 under the influence of time delay mechanism 20. The shuttle 28 does not move because it is held by the spring-loaded plungers 32 and 33. As the rear stop 27 contacts the shuttle 28, the shuttle starts to move from under the switch plungers 32 and 33. As the sloped surface 55 of the shuttle 28 reaches the plungers (FIG. 4), the bias force of the plungers 32 and 33 on the cam surface 55 causes the shuttle to rapidly "cam" out from under the plungers and slide along the shaft 24 until striking the forward stop 26. Further shaft travel has no effect on switches 30 and 31. When the water flow stops the large spring 39 (FIG. 1) pulls the stop 26 and timer shaft 24 back to the set position causing switch plungers 32 and 33 to ride back up the cam surface 55 of the shuttle 28 and rest on the flat portion 34 of the shuttle which causes the switches to return to the off-normal position.

A feature of the invention is that the plungers move substantially free of the timing mechanism 20 when they are releasing. By "substantially" here is meant the plungers move with little or no constraining force; i.e., only the frictional force between the shuttle 28 and shaft 24 constrains the plungers 32 and 33. This frictional force is minimal since the ultra high molecular weight polyethylene out of which the shuttle 28 is made has very low static and dynamic friction. Moving substantially freely, the plungers are able to release rapidly. This reduces the possibility of contact arcing and guarantees simultaneous switch operation. Further the switches 30 and 31 are substantially less expensive than the switches of the prior art water-flow detectors.

The setting of the stops 26 and 27 determines the distance the shuttle is moved by stop 26 upon the cocking of the timing mechanism and the distance stop 27 will move before engaging shuttle 28, and thus the distance over which the shuttle moves. The sum of the distance the stop 27 moves before engaging shuttle 28 and the distance shuttle 28 moves before plungers 32 and 33 reach cam surface 55 is a predetermined distance which corresponds to a predetermined time, which time is determinable by the adjusting of the bleed off mechanism 20. The precise time of delay will of course be determined by both the timer 20 setting and the stop positions. Preferably the stops are set so that the free space on the shaft 24 (the distance over which the caming shuttle 28 can move between stops 26 and 27) is at least as long as the horizontal length (the length along the shaft 24) of caming surface 55.

A novel water-flow detector with rapid switching has been described. It is evident that those skilled in the art may now make many uses and modifications of the specific embodiment described. For example, the shuttle 28 may be made of different materials or in different shapes and the means for moving it may take various forms. Consequently, the invention is to be construed as embracing each and every novel feature and combination of features present in the waterflow detector described.

What is claimed is:

1. A water flow detector comprising:
   a movably mounted water vane;
   a delay timer responsive to the movement of said water vane and including a movable timer member and means for moving said timer member over a predetermined distance corresponding to a predetermined time;
   a switch assembly including a spring biased switch arm movable between first and second positions for indicating movement of said water vane;
   a movable cam having a profile controlling movement of said switch arm between its first and second positions as a function of the disposition of said cam; and
   cam actuation means connected to said delay timer for driving said cam in a manner such that the cam profile maintains said switch arm in a first position during a portion of timer member movement and then permits relatively rapid movement of said switch arm to its second position, and wherein said spring biased arm delays movemet of said cam a sufficient time to allow for any water flow surges past said water vane.

2. A water-flow detector as in claim 1 wherein said cam comprises a hollow cylinder having a cone-shaped end, said timing member comprises a rod, and said cylinder is slidable on said rod.

3. A water-flow detector as in claim 1 and further comprising means for adjusting said predetermined time.

4. A water flow detector as in claim 1 wherein said cam actuation means comprises a first stop means for engaging said cam and urging it in a direction in which it tends to force said switch arm in a direction opposed to the direction it is normally biased and a second stop means for engaging said cam and urging it in a direction in which it tends to allow said switch arm to move to its second position;
   said first and second stop means being attached to said timing member means and spaced apart by a distance no greater than the distance between the points on the cam at which said respective stop means engage said cam.

5. A water-flow detector as in claim 4 wherein said cam comprises a caming shuttle movable along said timer member between said stops.

6. A water-flow detector as in claim 4 and further comprising means for adjusting the distance between said stops.

7. A water flow detector comprising:
   a water vane;
   a movable cam having a cam profile;
   a switch assembly including a spring biased switch arm that is movable between first and second positions under the influence of said cam profile for indicating movement of said water vane; and
   operative means for driving said cam a predetermined distance over a predetermined time in response to movement of said water vane, and wherein said cam profile and said operative means combine to delay movement of said switch arm from its first position after said water vane has been moved to allow for any water flow surges past the water vane and then allow relatively rapid movement of said switch arm to its second position after said delay.

8. A water flow detector according to claim 7 wherein said operative means comprises a delay timer mechanism including a movable timer member and means for moving said timer member over a predetermined distance corresponding to a predetermined time.

9. A water flow detector according to claim 8 wherein said cam profile includes first and second portions for controlling switch arm movement.

10. A water flow detector according to claim 8 wherein said operative means drives said cam along a substantially linear path.

11. A water flow detector according to claim 8 wherein said delay timer mechanism and said cam are connected such that said delay timer mechanism drives said cam in at least two directions and said cam is permitted to move substantially free of said timer member.

12. A water flow detector according to claim 11 wherein said delay timer mechanism includes first and second stops for engaging said cam, said first stop engaging said cam in a first direction of movement of said timer member and said second stop engaging said cam in a second direction of movement of said timer member.

13. A water flow detector according to claim 12 wherein said first and second stops are carried by said timer member and have said cam disposed therebetween.

14. A water flow detector according to claim 13 wherein said delay timer mechanism further includes means for adjusting the distance between the stops.

* * * * *